United States Patent [19]

Kuhl

[11] Patent Number: 4,799,460
[45] Date of Patent: Jan. 24, 1989

[54] VACUUM CLEANER FOR PETS

[76] Inventor: Lynn Kuhl, 1225 Fern Lake Ave., Brea, Calif. 92621

[21] Appl. No.: 101,004

[22] Filed: Sep. 25, 1987

[51] Int. Cl.⁴ .............................................. A01K 13/00
[52] U.S. Cl. ......................................... 119/85; 15/344
[58] Field of Search ............................ 119/85; 132/148; 15/300 R, 326, 344

[56] References Cited

U.S. PATENT DOCUMENTS

| | | | |
|---|---|---|---|
| D. 277,516 | 2/1985 | Hayden et al. | 15/344 |
| 1,018,136 | 2/1912 | Slevin | 119/85 |
| 2,564,339 | 8/1951 | Nerheim | 15/344 |
| 2,849,736 | 9/1958 | Kohle | 15/344 |
| 2,972,160 | 2/1961 | Hahn | 15/344 |
| 3,145,691 | 8/1964 | Yates | 119/85 |
| 3,513,500 | 5/1970 | Hori | 15/344 |
| 4,011,624 | 3/1977 | Proett | 15/344 |
| 4,185,355 | 1/1980 | Williams | 15/344 |
| 4,577,365 | 3/1986 | Yuen | 15/344 |

*Primary Examiner*—Robert Peshock
*Attorney, Agent, or Firm*—G. Donald Weber, Jr.

[57] ABSTRACT

A light weight, battery operated, portable unit which is primarily useful as a vacuum cleaner for pets. The unit includes an external housing, and a power source which is selectively connected to a motor which drives a fan within the housing. The housing includes an open area in which is created a vacuum (or air flow) as a result of the operation of the fan. A screen apparatus disposed within the housing prevents material from being drawn into the fan. The housing includes an opening through which the vacuum or air flow is produced. Bristles mounted in an annular ring surround the opening.

7 Claims, 1 Drawing Sheet

VACUUM CLEANER FOR PETS

BACKGROUND

1. Field of the Invention

This invention is directed to a vacuum cleaner unit, in general, and to a relatively small, light weight and portable vacuum cleaner which is useful for vacuuming and grooming pets, in particular.

2. Prior Art

There are many vacuum cleaners known in the prior art. These vacuum cleaners include devices which are used to vacuum specific elements such as carpets, rugs, draperies or the like. Most of the vacuum cleaner units known in the art are of the upright, tank-type and the like. On the other hand, portable, hand held units, e.g. the "Dust Buster" (TM) by Black & Decker, or other units which plug into an automobile lighter unit are also known.

Most of the known vacuum cleaners in the art include brushes which are motor driven to provide a sweeper action. Other units such as tank-type or built-in wall units create a vacuum or suction through a hose attachment thereto.

Moreover, the vast majority of the vacuum units known in the art incorporate heavy duty motors which are used to create a suction and to drive brushes (where appropriate). These motors are, typically, connected to standard AC power sources by means of a plug or the like.

Moreover, the known vacuum systems are relatively heavy and, as well, extremely noisy because of the motor apparatus which is used therewith.

Consequently, the known vacuum systems are not very practical when used in grooming of pets. For example, the sweeper, with rotating brushes, is totally unacceptable. The tank-type units, even the smaller units noted above, are usually too noisy or too powerful for use with most pets. That is, the pet becomes agitated and/or frightened as a result of the powerful suction and/or the loud noise produced by the standard vacuum cleaner. Consequently, a new vacuum cleaner design for pet cleaning and/or grooming is highly desirable.

PRIOR ART STATEMENT

Attention is directed to U.S. Pat. No. Des. 272,568, by Lynn Kuhl, entitled VACUUM CLEANER FOR PETS.

Copending application, Ser. No. 70,518, filed on July 6, 1987 by Lynn Kuhl et al is also referenced.

SUMMARY OF THE INVENTION

This invention is directed to a light weight, battery operated, portable vacuum cleaner device which is primarily useful as a vacuum cleaner for use with pets. The unit includes an external housing of suitable plastic-type material. A power source, e.g. a battery, is mounted within the housing. The power source is selectively connected to a motor via a switch to thereby drive a fan. The housing includes an open space in which is created a suction or air flow as a result of operation by the fan. A screen apparatus prevents material drawn into the cleaner housing from being drawn into the fan. The housing includes an opening in one end thereof through which the air flow is produced. A plurality of bristles surround the opening in an annular ring which is mounted in the housing opening and provides a type of comb or brush apparatus.

DESCRIPTION OF THE PREFERRED EMBODIMENT

Figure 1:
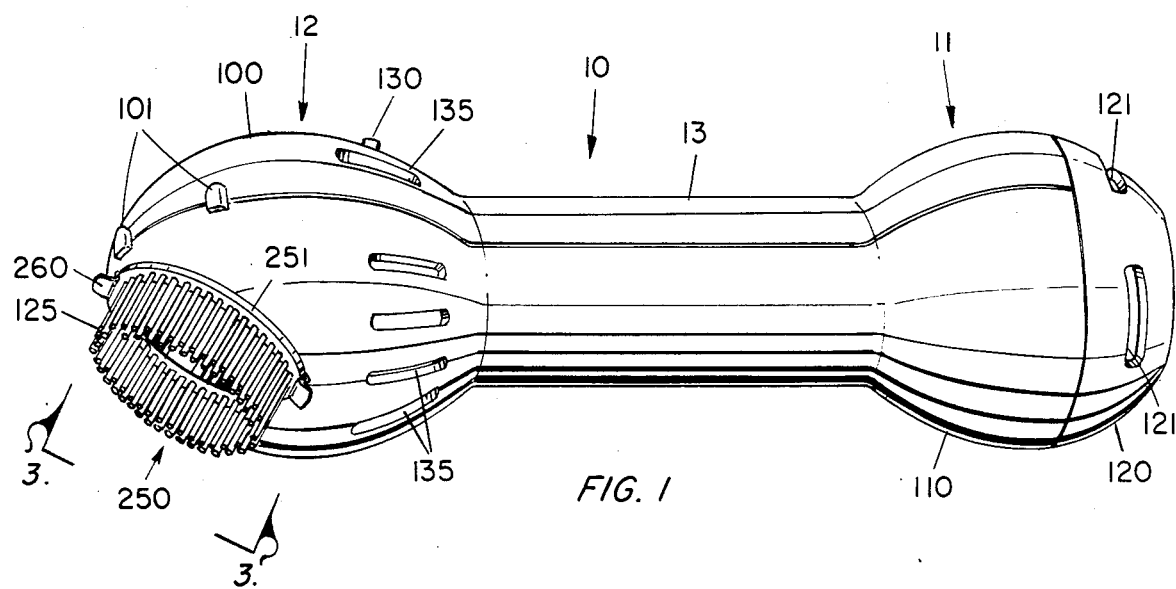
FIG. 1 is a view of the external appearance of the vacuum cleaner of the instant invention.

Referring now to FIG. 1, there is shown a general view of exterior arrangement of the vacuum cleaner 10 of the instant invention. In general, the unit 10 incorporates a generally bone-shaped configuration with a relatively narrow center (or neck) portion 13 and a pair of enlarged portions 11 and 12 at the rear and front ends, respectively. This shape is suggested as possibly being comforting to the pets.

The housing can be fabricated of any suitable material such as polypropylene or the like. Preferably, a high impact material is used in order to provide structural strength to support the apparatus and to prevent damage if it is accidentally dropped.

As noted in FIG. 1, the vacuum cleaner 10 includes an external housing having upper and lower portions 100 and 110, respectively. These portions are, typically, molded of a plastic-type material and are designed to interact to form an integral housing unit. In a preferred embodiment, the upper and lower portions 100 and 110 are arranged to snap together and to be held securely in place. In this instance, interlocking grooves and tabs (see FIG. 2) are formed as part of at least one of the upper and lower housing portions 100 and 110. It is expected, in this construction, that the housing portions will not be readily separable.

In addition, one or more guides 101 can be molded into one or both of the housing portions 100 and 110. The guides 101 can be used to assist in assembling the housing portions. Moreover, these guides are arranged to have a decorative configuration and to resemble cat claws.

In addition, an end cap 120 is arranged to fit together with the combined housing elements 100 and 110. Typically, the cap 120 is arranged to snap onto the ends of the housing units 100 and 110 after assembly. The cap 120 is arranged to be readily removable so that access to the interior of the housing can be obtained whereupon the power source, e.g. batteries 212, can be accessed and changed, if necessary. In addition, end cap 120 can include electrically conductive contacts for interconnecting a plurality of batteries 212, if desired. The openings 121 in cap 120 are provided to permit air flow and cooling for the system.

At the front end 12 of the lower housing portion 110 of unit 10 is a removable bristle cap or brush 250. The brush 250 is essentially, an annular disk 251 with a central aperture 210 therethrough. A plurality of bristles 125 are included in the brush 250. The bristles are, typically, formed of nylon, plastic or the like and can be firm, yet flexible, in order to groom but not irritate the pet. Conversely, the bristles 125 can be formed during the process of manufacturing of the brush 250. The bristles 125 surround the opening 210 in the disk 251 of the brush 250 which is "snap-mounted" into the opening 252 in the housing section 110 through which the vacuuming procedure is accomplished.

The brush 250 includes one or more snap catches 260 at the outer edges of disk 251. The brush 250 is, thus, arranged to snap into place in opening 252 in lower housing portion 110 and retain the brush 250 in place. The brush 250 can be removed in order to gain access to the interior space between housing portions 100 and 110 for cleaning purposes.

A thumb switch 130 is mounted in the upper housing 100 so that easy access thereto can be obtained during the operation of the unit. The thumb switch is used to selectively connect the power source to the motor (see FIG. 2) which causes the unit to operate.

A plurality of apertures 135 are provided in and through the rear portion of the front ends of the housing components 100. As will be seen, the apertures 135 permit an air flow to be created through the hole 210 associated with bristles 125, through the interior of housing 100 and 110 and out through the apertures 135 thereby effectively bypassing the fan and motor portion. Thus, this air flow creates a suction effect which, in conjunction with the bristles 125, permits the device to operate as a vacuum cleaner device and to remove dirt, loose hair, certain insect pests and the like from the animal which is being groomed.

Figure 2:
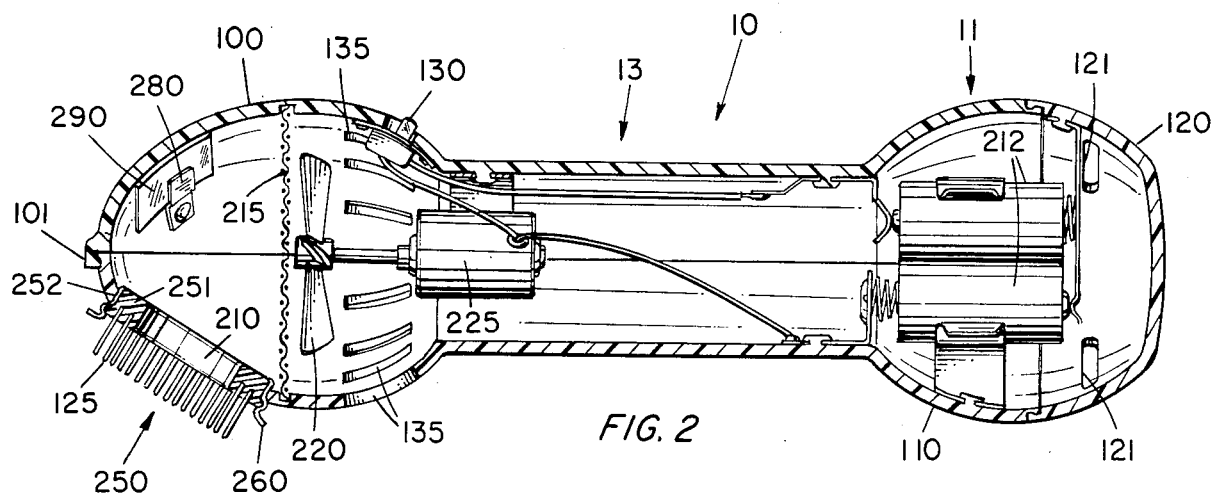
FIG. 2 is a substantially cross-sectional view of the invention as shown in FIG. 1.

Referring now to FIG. 2, there is shown a cross-sectional view of the apparatus shown in FIG. 1. In FIG. 2, components which are similar to those shown in FIG. 1 bear similar reference numerals.

Thus, the upper and lower housing elements 100 and 110 are shown joined together by a suitable latching joint molded into the parts. The cap 120 is shown to be engaged with the distal or rear end portions 11 of housing elements 100 and 110.

As is shown in FIG. 2, the rear end 11 of the vacuum cleaner mechanism is an enlarged portion, similar to the front end 10. Housing end 11 is adapted to enclose and support the power source for the unit 10. In particular, the power source comprises one or more batteries 212 which can be of any appropriate size and electrical capacity so as to be able to drive the motor 225 and, thus, operate the overall system. Typically, the unit 10 will incorporate up to four (4) batteries of the 1½ volt C-type, although the number of batteries is not limitative of the invention. The batteries 212 are mounted within the end 11 of the housing portions by means of appropriate support structures 13 which are included in the housing.

In this instance, the brush 250 is shown inserted into or joined with the housing portion 110. In particular, brush 250 is mounted in the opening in the front end 12 of the unit 10. A screen 215 is mounted within space at the front end of unit by means of appropriate ledges or the like which are formed in the housing elements 100 and 110, respectively. This mounting arrangement can take the form of an annular groove, as shown, or, alternatively, by appropriate latching means or the like, as is desired.

A fan 220 is also mounted in the space defined by the housing of unit 10. In the preferred embodiment, the fan 220 is mounted within the enlarged portion of the unit, but behind screen 215, i.e. on the opposite side of the screen as related to the intake opening 210 in brush 250. Thus, the fan 220 produces an air flow which enters the unit via opening 210, passes through screen 215 and emerges from the housing portions 100 and 110 through one or more of the apertures 135. As a result, any dirt, loose hair or the like which is vacuumed into the sytem is intercepted by the screen 215 and does not reach fan 220 or the motor 225 so as to interfere therewith or cause damage thereto.

Fan 220, typically, includes a blade or the like which is mounted on a shaft of a motor 225. Typically, motor 225 in this application is a 6 volt motor. This motor is adapted to be lightweight and as quiet as possible so as to prevent any noise from agitating the animal which is being groomed. One terminal of the motor is connected to the batteries 212.

Switch 130 is connected in electrical circuit between the batteries 212 and the other terminal of motor 225 so that the motor can be selectively activated by the user of the apparatus. That is, in order to produce a vacuuming operation, the user grasps the unit 10 at the narrow neck portion 13 thereof. The thumb of the user is placed on switch 130 to cause selective operation thereof. The grooming unit 10 is then placed adjacent to the animal to be groomed with the bristles 125 and opening 210 of brush 250 placed adjacent to and/or in contact with the animal. The bristles 125 will operate to provide a certain combing effect on the hair or fur of the animal. As well, the bristles 125 will function to dislodge any loosened hair, dirt or the like which may be associated with the animal.

When switch 130 is placed in the ON position, motor 225 is activated by the batteries 212 and causes fan 220 to operate. Operation of fan 220 causes an air flow (indicated by the arrows) inwardly through opening 210 and outwardly through openings 135. The air flow will, typically, pass through screen 215. The screen 215 prevents any of the hair, dirt or other materials from passing into the fan 220 and motor 225. In the event that suction is reduced because of the accumulation of debris within the end 12 of unit 10, it is a simple task to remove brush 250 thereby providing access to the interior of the unit. The accumulated debris is then removed through the opening 252 left by removal of the brush 250 from the housing in the enlarged opening in front of screen 215 whereupon the system is ready for assembly and reuse.

In an alternative and optional arrangement, a suitable mounting element 280 can be included on the internal surface of at least one of the housing portions 100 and 110. In the embodiment shown, the latch 280 is provided on the internal surface of upper housing portion 100. The latching element 280 is used to support an insecticide material, for example a portion of a pest strip or the like. Thus, the latch 280 can comprise any appropriate configuration, while the pest strip portion 290 can comprise a portion of a flea collar or the like. Thus, a pesticide and/or a scent producing component can be mounted within the apparatus housing to provide the appropriate function during the grooming process.

Figure 3:
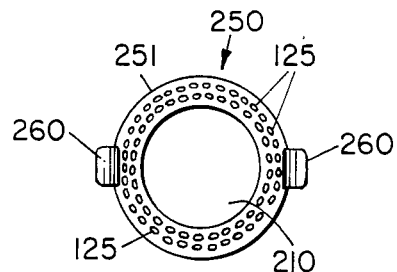
FIG. 3 is an enlarged view of the brush insert of the invention taken along the lines 3—3 in FIG. 1.

Referring now to FIG. 3, there is shown a view of the brush 250 of the vacuum unit. In this instance, the aperture 210 is shown as a central opening in the disk 251 of the brush 250 with the bristles 125 arranged therearound. In particular, the configuration shown in FIG. 3 shows at least two (2) concentric circular arrangements of bristles 125 where the bristles in the inner circle are offset from the bristles in the outer circle. Of course, any other suitable configuration of bristles can be selected, if so desired.

Thus, there is shown and described a preferred embodiment of the instant invention. The preferred embodiment describes the invention as having a bone-shaped configuration which may be recognizable to the pet being groomed. In addition, the unit is defined as being fabricated of a high impact, light weight plastic-type material. The specific arrangement of components which has been shown and described is believed to be a preferrable arrangement. However, it is clear that other arrangements can be utilized. For example, the method of interlocking the housing members 100 and 110 can be varied. Moreover, the housing may be separable into more components than those shown. Also, the housing portions can be assembled together by screws, adhesives or the like. Furthermore, various means and methods of mounting the various components within the housing are contemplated. That is, these mounting arrangements can, for the most part, reflect design preferences.

It is clear that those skilled in the art may develop other configurations and/or provide design changes or modifications to any portion of the apparatus. However, any such changes or modifications which fall within the purview of this description are intended to be included therein as well. This description of the invention is intended to be illustrative only and is not intended to be limitative. Rather, the scope of the invention is limited only by the claims appended hereto.

Having thus described a preferred embodiment of the invention, what is claimed is:

1. A pet vacuum cleaner apparatus comprising, housing means, said housing means includes at least an upper housing portion and a lower housing portion which housing portions are joined together to form said housing means, prime mover means mounted within said housing means, said housing means includes a relatively narrow, cylindrical middle section and a pair of relatively enlarge end sections said prime mover means comprises a lightweight, low voltage motor which produces minimal noise during operation thereof, power source means, switch means mounted in said upper housing portion and connected between said power source means and said prime mover means to selectively energize said prime mover means via said switch means, fan blade means connected to and driven by said prime mover means with said housing means, intake means disposed in said housing means in order to provide an air passage through the wall of said housing means, end caps means adapted to be attached to said upper and lower housing portions at the opposite end of said housing relative to the intake means, brush means adapted to be mounted at said intake means, said brush means is selectively detachable from said housing means whenever said housing may be emptied of accumulated debris, said brush means includes an annular disk with a relatively large central aperture therethrough, said brush means includes a plurality of pliant bristles mounted in and extending axially out of said annular disk, and screen means mounted within said housing means between said fan blade means and said intake means.

2. The apparatus recited in claim 1 wherein, said brush means includes at least one snap latch for securing said brush means to said housing means at said intake means.

3. The apparatus recited in claim 1 wherein, said housing means includes a plurality of apertures in said housing means behind said screen means and said fan blade means.

4. The apparatus recited in claim 1 including, guide means formed at at least one of said upper and lower housing portions for locking said housing portions together.

5. The apparatus recited in claim 1 including, mounting means disposed within said housing means for supporting a grooming enhancement chemical device within said housing means.

6. The apparatus recited in claim 1 wherein, said brush means includes at least two concentric rows of bristles around said central aperture.

7. The apparatus recited in claim 1 wherein, said power source means comprises battery means.

* * * * *